(12) United States Patent
Janson et al.

(10) Patent No.: US 12,103,381 B1
(45) Date of Patent: Oct. 1, 2024

(54) DIFFERENTIAL WITH DISCONNECT

(71) Applicant: FORD GLOBAL TECHNOLOGIES, LLC, Dearborn, MI (US)

(72) Inventors: David Allen Janson, Plymouth, MI (US); Gregory Daniel Goleski, Rochester Hills, MI (US); Matthew David Hammond, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/349,652

(22) Filed: Jul. 10, 2023

(51) Int. Cl.
| | |
|---|---|
| *F16D 11/14* | (2006.01) |
| *B60K 17/02* | (2006.01) |
| *B60K 17/16* | (2006.01) |
| *F16D 27/118* | (2006.01) |
| *F16H 48/08* | (2006.01) |
| *F16H 57/021* | (2012.01) |
| *F16H 57/037* | (2012.01) |
| *F16D 11/00* | (2006.01) |
| *F16D 127/02* | (2012.01) |
| *F16H 57/02* | (2012.01) |

(52) U.S. Cl.
CPC ............ *B60K 17/02* (2013.01); *B60K 17/165* (2013.01); *F16D 11/14* (2013.01); *F16D 27/118* (2013.01); *F16H 48/08* (2013.01); *F16H 57/021* (2013.01); *F16H 57/037* (2013.01); *F16D 2011/002* (2013.01); *F16D 2127/02* (2013.01); *F16D 2300/14* (2013.01); *F16H 2057/02052* (2013.01)

(58) Field of Classification Search
CPC ....... B60K 17/02; B60K 17/165; F16D 11/14; F16D 27/118; F16D 2011/002; F16D 2127/02; F16D 2300/14; F16H 48/08; F16H 57/021; F16H 57/037; F16H 2057/02052

See application file for complete search history.

(56) References Cited

U.S. PATENT DOCUMENTS

| | | | |
|---|---|---|---|
| 7,156,771 B2 * | 1/2007 | Teraoka | F16D 23/06 477/181 |
| 7,594,800 B2 | 9/2009 | Teipen | |
| 7,836,675 B2 | 11/2010 | Corattiyil et al. | |
| 7,975,796 B2 | 7/2011 | Guo | |
| 8,821,332 B2 | 9/2014 | Kawamura et al. | |
| 9,193,263 B2 | 11/2015 | Ekonen et al. | |
| 9,695,885 B2 | 7/2017 | Tamoto et al. | |
| 9,759,303 B2 | 9/2017 | Peura | |
| 10,227,001 B2 | 3/2019 | Yoshisaka et al. | |
| 10,391,861 B2 | 8/2019 | Richards et al. | |
| 10,571,007 B2 | 2/2020 | Ziech | |
| 11,065,957 B2 | 7/2021 | Maruyama et al. | |

(Continued)

FOREIGN PATENT DOCUMENTS

DE         102020213740 A1 *  5/2022

*Primary Examiner* — Justin Holmes
(74) *Attorney, Agent, or Firm* — Brooks Kushman P.C.

(57) ABSTRACT

A differential includes a disconnect feature. When in a disengaged state, the drive gear is decoupled from the differential carrier. As a result, the portions of the powertrain that would provide propulsion through the differential may be stationary and parasitic drag is decreased. The differential is transitioned into an engaged state by providing electrical current in a solenoid coil fixed to the housing. A solenoid piston acts through a thrust bearing to slide a sleeve, thereby coupling the carrier to the drive gear.

17 Claims, 4 Drawing Sheets

(56) References Cited

U.S. PATENT DOCUMENTS

| | | |
|---|---|---|
| 11,105,406 B2 | 8/2021 | Boudreau |
| 11,231,098 B2 | 1/2022 | Swinger |
| 11,247,558 B2* | 2/2022 | Hofer .................... B60K 17/348 |
| 2006/0046890 A1* | 3/2006 | Aikawa .............. B60K 23/0808 |
| | | 475/231 |
| 2012/0202636 A1 | 8/2012 | Perakes et al. |
| 2015/0011349 A1* | 1/2015 | Downs ................. B60K 17/165 |
| | | 475/198 |
| 2020/0340573 A1 | 10/2020 | Matsumoto |
| 2021/0347258 A1 | 11/2021 | Brammer et al. |
| 2023/0272846 A1* | 8/2023 | Yamamoto .............. F16H 48/08 |
| | | 475/231 |

\* cited by examiner

DIFFERENTIAL WITH DISCONNECT

TECHNICAL FIELD

The present invention relates to an automotive axle assembly. More particularly, the disclosure relates to a differential which can be disconnected from a drive source.

BACKGROUND

Hybrid vehicles include multiple propulsion sources, such as an internal combustion engine and an electric motor. When one of these sources is not being used, it is beneficial if it can be stopped to reduce parasitic drag. A differential is typically used to distribute mechanical power from one or both propulsion sources to left and right vehicle wheels while allowing slight speed differences.

SUMMARY

A vehicle differential includes a drive gear, a carrier, gearing, and a sleeve. The drive gear is supported for rotation with respect to a housing. The drive gear may be directly supported for rotation with respect to the housing by two ball bearing assemblies. The carrier is directly supported for rotation with respect to the drive gear by two sets of needle bearings. Each set of needle bearings contacts the drive gear and the carrier. The gearing is configured to transmit torque from the carrier to left and right stub shafts and to constrain the carrier to rotate at a speed between speeds of the left stub shaft and the right stub shaft. The left and right stub shafts may be directly supported by the carrier. The gearing may include beveled left and right side gears and a plurality of beveled planet gears. The beveled left side gear is fixed to the left stub shaft. The beveled right side gear is fixed to the right stub shaft. The plurality of beveled planet gears each mesh with the left side gear and the right side gear and are supported for rotation with respect to the carrier. A distance from an axis of rotation of the carrier to a needle bearing of the two sets of needle bearings may be less than a radius of the left side gear. The sleeve is slidingly connected to the carrier and configured to selectively couple the drive gear to the carrier. A solenoid coil may be fixed to the housing. A solenoid piston may be configured to slide axially in response to an electrical current in the solenoid coil. A thrust bearing may be between the solenoid piston and the sleeve to push the sleeve into an engaged position with the drive gear. A compression spring may act between the carrier and the sleeve to push the sleeve away from the engaged position.

A vehicle differential includes a drive gear, a carrier, gearing, a sleeve, a solenoid coil, a solenoid piston, and a thrust bearing. The drive gear is supported for rotation with respect to a housing. The drive gear may be directly supported for rotation with respect to the housing by two ball bearing assemblies. The carrier is supported for rotation with respect to the drive gear by two sets of needle bearings. Each set of needle bearings contacts the drive gear and the carrier. The gearing is configured to transmit torque from the carrier to left and right stub shafts and to constrain the carrier to rotate at a speed between speeds of the left stub shaft and the right stub shaft. The left and right stub shafts may be directly supported by the carrier. The gearing may include beveled left and right side gears and a plurality of beveled planet gears. The beveled left side gear may be fixed to the left stub shaft. The beveled right side gear may be fixed to the right stub shaft. The plurality of beveled planet gears may each mesh with the left side gear and the right side gear and be supported for rotation with respect to the carrier. A distance from an axis of rotation of the carrier to a needle bearing of the two sets of needle bearings may be less than a radius of the left side gear. The sleeve is slidingly connected to the carrier and configured to selectively couple the drive gear to the carrier. The solenoid coil is fixed to the housing. The solenoid piston is configured to slide axially in response to an electrical current in the solenoid coil. The thrust bearing pushes the sleeve into an engaged position with the drive gear in response to the axial movement of the solenoid piston. A compression spring may act between the carrier and the sleeve to push the sleeve away from the engaged position.

A vehicle differential includes a drive gear, a carrier, beveled left and right side gears, a plurality of beveled planet gears, and a sleeve. The drive gear is supported for rotation with respect to a housing. The drive gear may be directly supported for rotation with respect to the housing by two ball bearing assemblies. The carrier is supported for rotation with respect to the drive gear by two sets of needle bearings. Each set of needle bearings contacts the drive gear and the carrier. The beveled left side gear is fixed to a left stub shaft. The beveled right side gear is fixed to a right side shaft. The left and right stub shafts may be directly supported by the carrier. The plurality of beveled planet gears mesh with the left side gear and the right side gear and are supported for rotation with respect to the carrier. The sleeve is slidingly connected to the carrier and is configured to selectively couple the drive gear to the carrier. A distance from an axis of rotation of the carrier to a needle bearing of the two sets of needle bearings is less than a radius of the left side gear. A solenoid coil may be fixed to the housing. A solenoid piston may be configured to slide axially in response to an electrical current in the solenoid coil. A thrust bearing between the solenoid piston and the sleeve may push the sleeve into an engaged position with the drive gear. A compression spring may act between the carrier and the sleeve to push the sleeve away from the engaged position.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
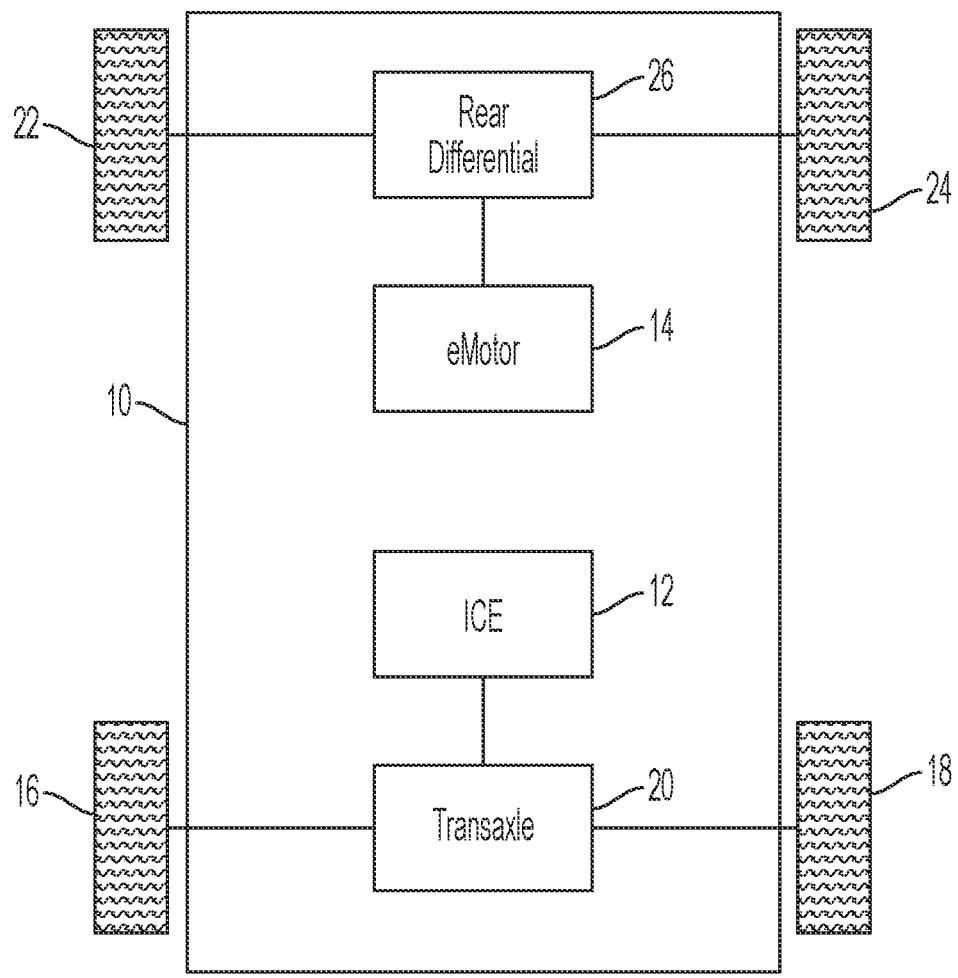
FIG. 1 illustrates a block diagram of a hybrid vehicle powertrain.

FIG. 1 illustrates a vehicle powertrain configuration for a hybrid vehicle 10. Power is provided by an internal combustion engine 12 and by an electric motor 14. At a given time, power may be provided by the engine 12, by the motor 14, or by a combination of the two. The engine 12 drive front wheels 16 and 18 via a transaxle 20. The electric motor 14 drives rear wheels 22 and 24 via rear differential 26. The transaxle 20 includes a variable ratio gearbox and a differential which distributes the power between left and right wheels while allowing some difference of speed between the left and right wheels. During times when only one of the two power sources is providing power, it is beneficial to disconnect the power source from the wheels to reduce parasitic drag associated with spinning the power source.

Figure 2:
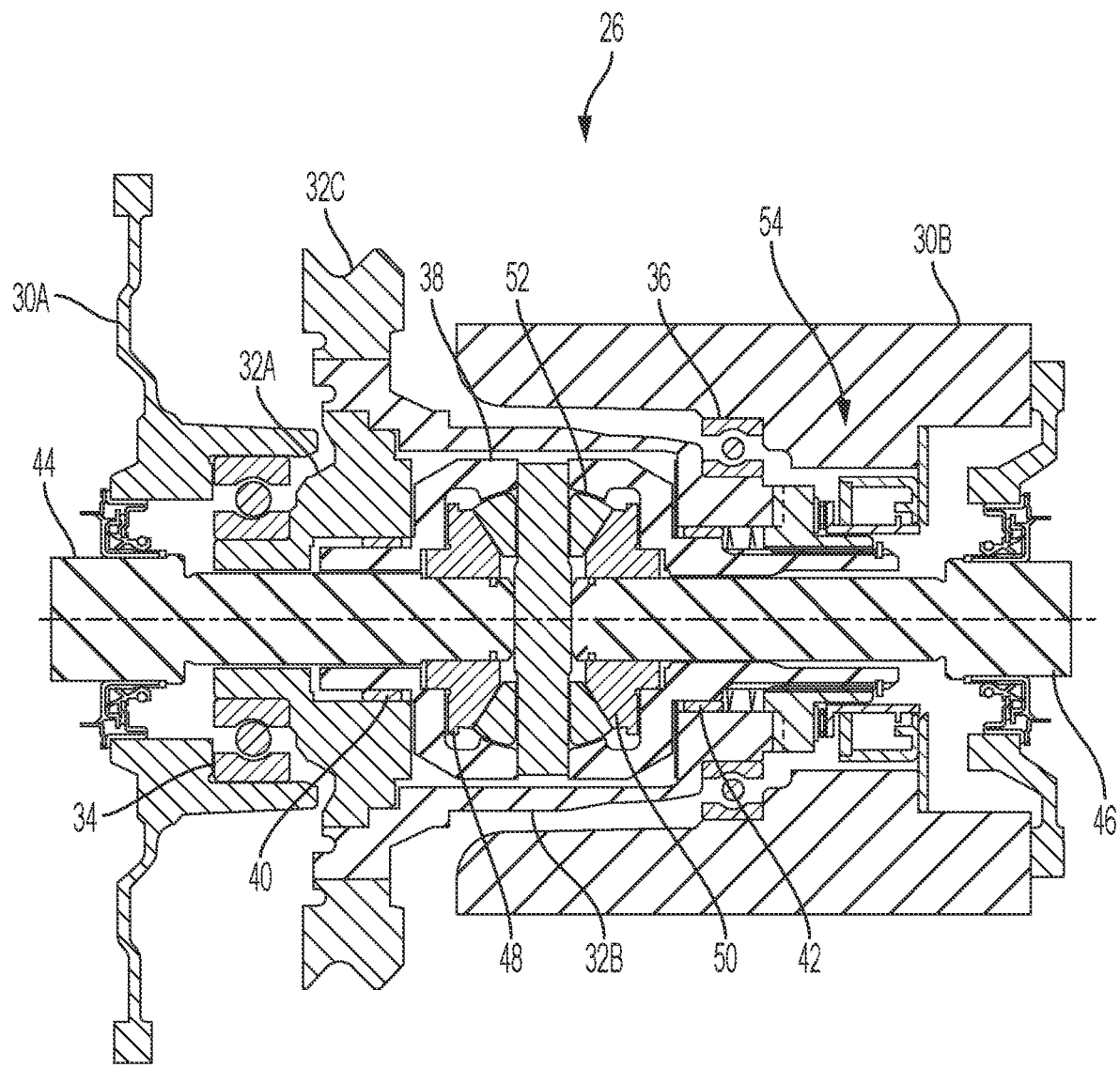
FIG. 2 illustrates a disconnectable differential suitable for use in the hybrid powertrain of FIG. 1.

FIG. 2 is a cross section of a differential 26 with a disconnect feature. Although this is the rear differential associated with the electric motor, the differential that is part of transaxle 20 may be structured similarly. Furthermore, the differential may be utilized in other powertrain configurations, such as a Battery Electric Vehicle (BEV) that utilizes electric motors to propel both the front and rear axles. A housing 30 is rotationally fixed to the vehicle structure. The housing may be in multiple parts, such as 30A and 30B. Drive gear 32 is supported for rotation with respect to the housing 30 and is propelled by the power source. The drive gear 32 may be formed from several pieces that are attached to one another. In this example, left 32A and right 32B portions of the drive gear are attached to one another and to gear element 32C. Left portion 32A is directly supported by the housing via ball bearing 34. Right portion 32B is directly supported by the housing via ball bearing 36. In the illustrated embodiment, gear element 34C is a parallel-axis helical gear. In other embodiments, other types of gearing, such as hypoid gearing may be utilized.

Directly supported means that the no intervening components other than the bearing itself are present between the components. For this purpose, bearing races and the rolling elements of the bearing are considered part of the bearing. Indirectly supported, on the other hand, describes arrangements in which an intervening component may have a rotational speed different than the supported element and the supporting element.

Differential carrier 38 is directly supported by the drive gear 32 via needle bearings 40 and 42. Left stub shaft 44 and right stub shaft 46 are directly supported by the differential carrier. The relative rotational speed of the stub shafts and the carrier tends to be small, so a bushing may be sufficient. Differential gearing distributes torque from the carrier to the left and right stub shaft while allowing slight speed differences. The stub shafts are coupled to the respective wheels by half shafts. Several different types of differential gearing are known. In the illustrated embodiment, a beveled left side gear 48 is fixed to left stub shaft 44 and a beveled right side gear 50 is fixed to right stub shaft 46. A set of beveled planet gears 52 are supported for rotation with respect to the differential carrier 38. Each planet gear meshes with both the left side gear and the right side gear.

A coupler 54 selectively couples the differential carrier 38 to the drive gear 32. The structure and function of the coupler will be described in more detail below. When the power source is being used, the coupler 54 is set an engaged position to couple the drive gear to the carrier to establish a power flow path from the drive gear to the stub shafts. Two components are said to be coupled when the speeds are constrained to be equal and rotational power may be transferred between the components. When the power source is not being used, the coupled may be set to a disengaged position in which the drive gear and the differential carrier may rotate at different speeds. More particularly, the carrier would rotate at the average speed of the two wheels while the drive gear may be stationary.

It is advantageous to support a rotating shaft using bearings located a relatively small distance from the center of rotation. The configuration of FIG. 2 permits use of bearings 34, 36, 40, and 42 which are relatively close to the center of rotation. More specifically, bearings 40 and 42 are located closer to the axis of rotation than a radius of the side gears 48 and 50.

Figure 3A:
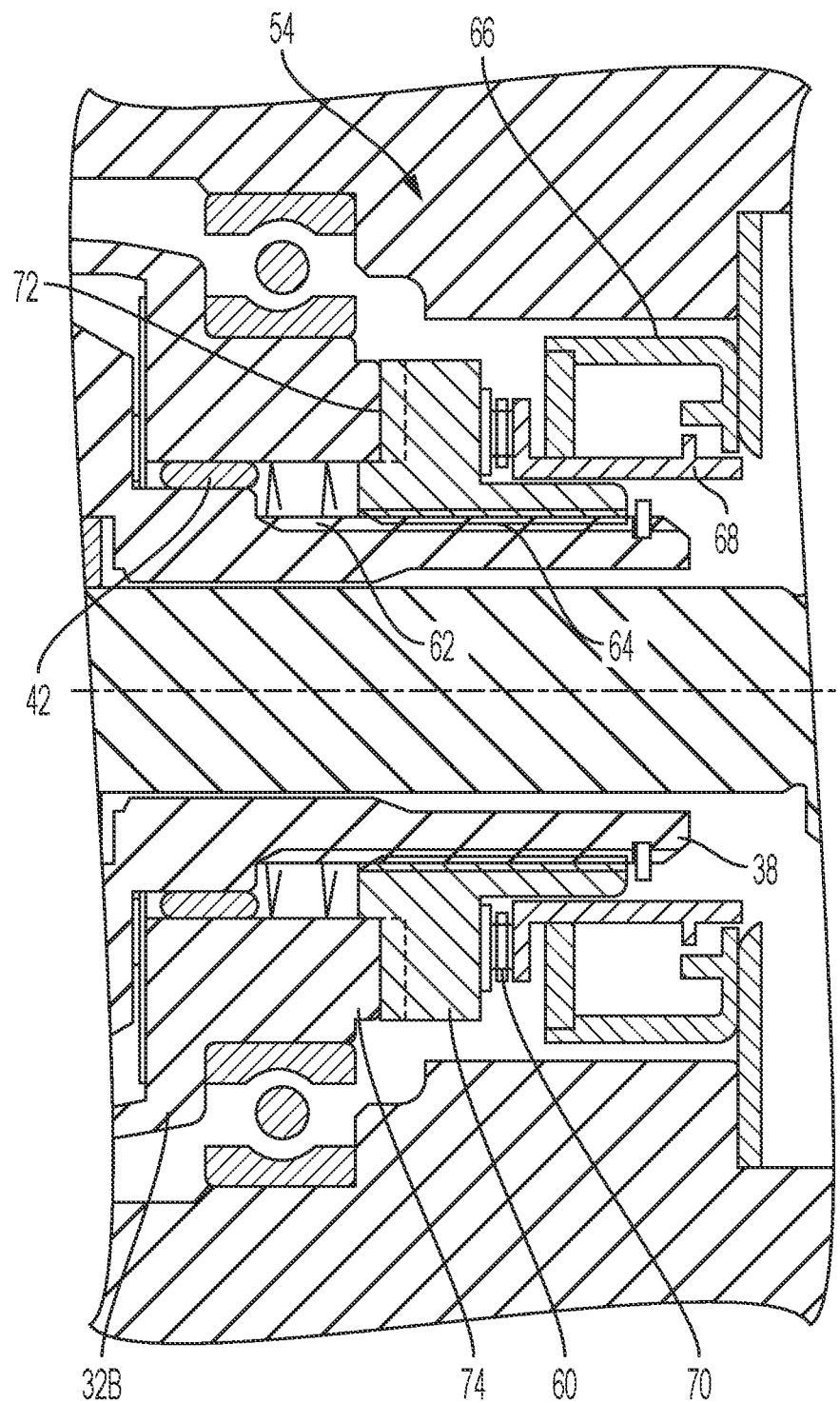
FIGS. 3A and 3B illustrate the coupler of the disconnectable differential of FIG. 2 in an engaged state and a disengaged state, respectively.
Figure 3B:
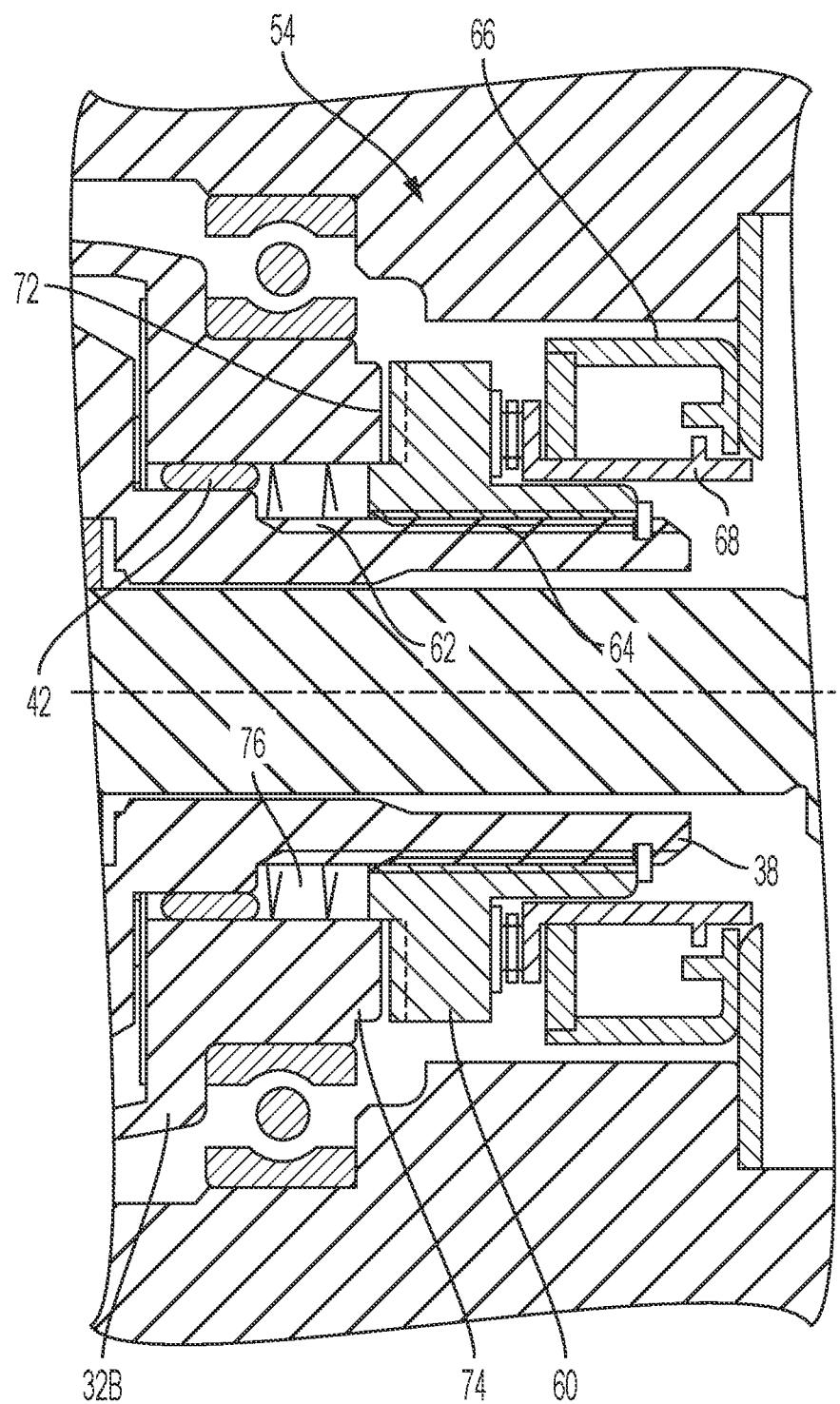

FIGS. 3A and 3B illustrate the coupler 54 in more detail. FIG. 3A shows the coupler in an engaged position in which carrier 38 is coupled to drive gear 32. FIG. 3B shows the coupler in a disengaged position in which carrier 38 and drive gear 32 are free to have different speeds with a small amount of drag torque between these two components. The coupler 54 includes a sleeve 60 slidingly connected to the carrier 38. Specifically, carrier 38 includes an external spline 62 which meshes with an internal spline 64 of sleeve 60 such that the sleeve 60 rotates with the carrier 38 but may move axially. A solenoid coil 66 is fixed to the housing. Current in the solenoid coil forces solenoid piston 68 toward the left. Solenoid piston 68, acting through thrust bearing 70, pushes the sleeve 60 leftward into the engaged position of FIG. 3A. In this engaged position, an end spline 72 of the sleeve 60 engages an end spline 74 of the drive gear 32, coupling the drive gear to the carrier 38. When the current in the solenoid coil 66 is removed, a return spring 76 pushes the sleeve 60 rightward into the disengaged position of FIG. 3B. In this disengaged position, end spline 72 is not engaged with end spline 74. As a result, the speed of drive gear 32 may differ from the speed of carrier 38.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A vehicle differential comprising:
 a drive gear supported for rotation with respect to a housing;
 a carrier directly supported for rotation with respect to the drive gear by a first set of bearings and a second set of bearings;
 gearing axially located between the first set of bearings and the second set of bearings and configured to transmit torque from the carrier to left and right stub shafts and to constrain the carrier to rotate at a speed between speeds of the left stub shaft and the right stub shaft;
 a sleeve slidingly connected to the carrier and configured to selectively couple the drive gear to the carrier;
 a solenoid coil fixed to the housing;
 a solenoid piston configured to slide axially in response to an electrical current in the solenoid coil; and
 a thrust bearing between the solenoid piston and the sleeve to push the sleeve into an engaged position with the drive gear.

2. The vehicle differential of claim 1 wherein the drive gear is directly supported for rotation with respect to the housing by two ball bearing assemblies.

3. The vehicle differential of claim 1 wherein the gearing comprises:
 a beveled left side gear fixed to the left stub shaft;
 a beveled right side gear fixed to the right stub shaft; and a plurality of beveled planet gears each meshing with the left side gear and the right side gear and supported for rotation with respect to the carrier.

4. The vehicle differential of claim 3 wherein a distance from an axis of rotation of the carrier to a bearing of the first set of bearings is less than a radius of the left side gear.

5. The vehicle differential of claim 1 wherein the left and right stub shafts are directly supported by the carrier.

6. The vehicle differential of claim 1 further comprising a compression spring acting between the carrier and the sleeve to push the sleeve away from the engaged position.

7. A vehicle differential comprising:
- a drive gear supported for rotation with respect to a housing;
- a carrier supported for rotation with respect to the drive gear by two sets of needle bearings, each set of needle bearings contacting the drive gear and the carrier;
- gearing configured to transmit torque from the carrier to left and right stub shafts and to constrain the carrier to rotate at a speed between speeds of the left stub shaft and the right stub shaft;
- a sleeve slidingly connected to the carrier and configured to selectively couple the drive gear to the carrier;
- a solenoid coil fixed to the housing;
- a solenoid piston configured to slide axially in response to an electrical current in the solenoid coil; and
- a thrust bearing between the solenoid piston and the sleeve to push the sleeve into an engaged position with the drive gear.

8. The vehicle differential of claim 7 further comprising a compression spring acting between the carrier and the sleeve to push the sleeve away from the engaged position.

9. The vehicle differential of claim 7 wherein the drive gear is directly supported for rotation with respect to the housing by two ball bearing assemblies.

10. The vehicle differential of claim 7 wherein the gearing comprises:
- a beveled left side gear fixed to the left stub shaft;
- a beveled right side gear fixed to the right stub shaft; and
- a plurality of beveled planet gears each meshing with the left side gear and the right side gear and supported for rotation with respect to the carrier.

11. The vehicle differential of claim 10 wherein a distance from an axis of rotation of the carrier to a needle bearing of the two sets of needle bearings is less than a radius of the left side gear.

12. The vehicle differential of claim 7 wherein the left and right stub shafts are directly supported by the carrier.

13. A vehicle differential comprising:
- a drive gear supported for rotation with respect to a housing;
- a carrier supported for rotation with respect to the drive gear by two sets of needle bearings, each set of needle bearings contacting the drive gear and the carrier;
- a beveled left side gear fixed to a left stub shaft;
- a beveled right side gear fixed to a right side shaft;
- a plurality of beveled planet gears each meshing with the left side gear and the right side gear and supported for rotation with respect to the carrier; and
- a sleeve slidingly connected to the carrier and configured to selectively couple the drive gear to the carrier;
- wherein a distance from an axis of rotation of the carrier to a needle bearing of the two sets of needle bearings is less than a radius of the left side gear.

14. The vehicle differential of claim 13 wherein the drive gear is directly supported for rotation with respect to the housing by two ball bearing assemblies.

15. The vehicle differential of claim 13 wherein the left and right stub shafts are directly supported by the carrier.

16. The vehicle differential of claim 13 further comprising:
- a solenoid coil fixed to the housing;
- a solenoid piston configured to slide axially in response to an electrical current in the solenoid coil; and
- a thrust bearing between the solenoid piston and the sleeve to push the sleeve into an engaged position with the drive gear.

17. The vehicle differential of claim 16 further comprising a compression spring acting between the carrier and the sleeve to push the sleeve away from the engaged position.

* * * * *